Oct. 15, 1946.  T. E. LAW  2,409,439
WIND POWER PLANT
Filed Sept. 19, 1944

INVENTOR.
Thomas E. Law
BY
Frederick Diehl
ATTORNEY

Patented Oct. 15, 1946

2,409,439

UNITED STATES PATENT OFFICE 2,409,439

WIND POWER PLANT

Thomas E. Law, Central Heights Globe, Ariz.

Application September 19, 1944, Serial No. 554,811

1 Claim. (Cl. 170—14)

This invention relates generally to prime movers, and more particularly to power plants of the wind driven type.

An object of this invention is to provide a wind driven power plant embodying a rotor which is exposed to the wind in a manner to be driven thereby, and whose speed of rotation can be maintained within safe limits by automatically operating governor mechanism, irrespective of the velocity of the wind.

Another object of the invention is to provide a power plant of the above described character whose rotor is mounted on a power take-off shaft and includes a set of vanes which travel into and out of a dead air or brake chamber during rotation of the rotor, such chamber having one or more valved air inlets through which air is admitted in controlled amounts by the governor mechanism so as to act upon those vanes within the chamber, in opposition to the impelling action of the air upon those vanes which are exposed from the chamber, to thus set up a braking effect upon the rotor, which varies in proportion to the strength of the wind so that the resulting impelling force of the wind upon the rotor, and hence the torque developed at the power take-off shaft will be maintained substantially uniform irrespective of variations in wind velocity, whereby to enable the rotor to be rotated at a predetermined maximum safe speed.

A further object of the invention is to provide a governor controlled wind driven power plant as above set forth wherein the valved air inlets of the brake chamber can be maintained at maximum opening in opposition to the controlling action of the governor mechanism, so that the braking effect of the air upon those vanes within the brake chamber will be practically equal to the impelling force of the air upon those vanes which are exposed from the chamber, with the result that no torque will be developed at the power take-off shaft, and the rotor will remain at rest.

With these and other objects in view, the invention resides in the combinations and arrangements of elements as set forth in the following specification and particularly pointed out in the appended claim.

In the accompanying drawing.

Figure 2:
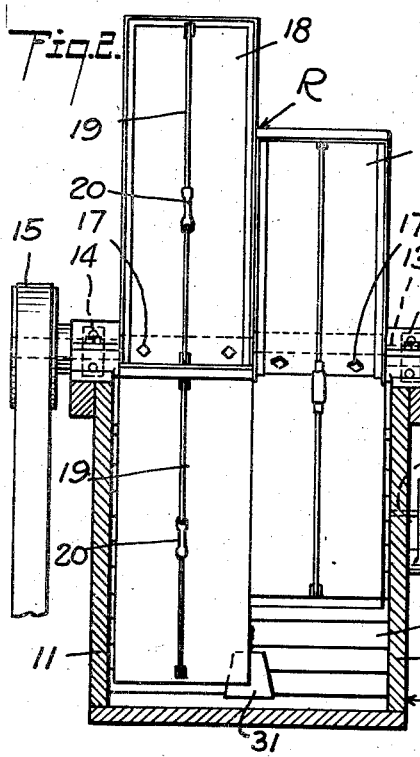
Figure 2 is a transverse sectional view taken on the line 2—2 of Figure 1.
Figure 3:
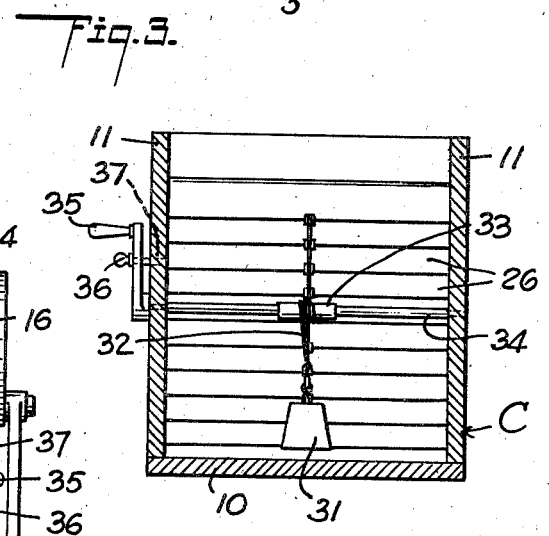
Figure 3 is a transverse sectional view taken on the line 3—3 of Figure 1.

Referring specifically to the drawing, the invention comprises a rotor R and a support or mounting therefor in the form of a dead air or brake chamber C of rectangular outline, having a bottom 10, side walls 11, end walls 12, and an open top, which latter is spanned transversely of the chamber by a power take-off shaft 13 journaled in suitable anti-friction bearings 14 supported on the side walls 11. As shown in Figure 2, the ends of the shaft 13 project beyond the outer sides of the bearings 14 and are adapted to be operatively connected to various power transmitting mechanisms 15 and 16.

Between the bearings 14, the shaft 13 is divided into two portions of square cross section which are relatively displaced 90 degrees, and have rigidly secured thereto by bolts 17, vanes 18 of sheet metal suitably reinforced around their edges to render them rigid. The illustrated arrangement thus provides for eight vanes equally spaced circumferentially in two groups of four each, with the successive vanes of each group being rigidly connected by three or more tie rods 19 having suitable turnbuckles 20. It will be clear from this arrangement that as the rotor R rotates, the vanes successively enter and leave the chamber C at approximately the level of the axis of rotation of the shaft 13, for a purpose to be later described.

Figure 1:
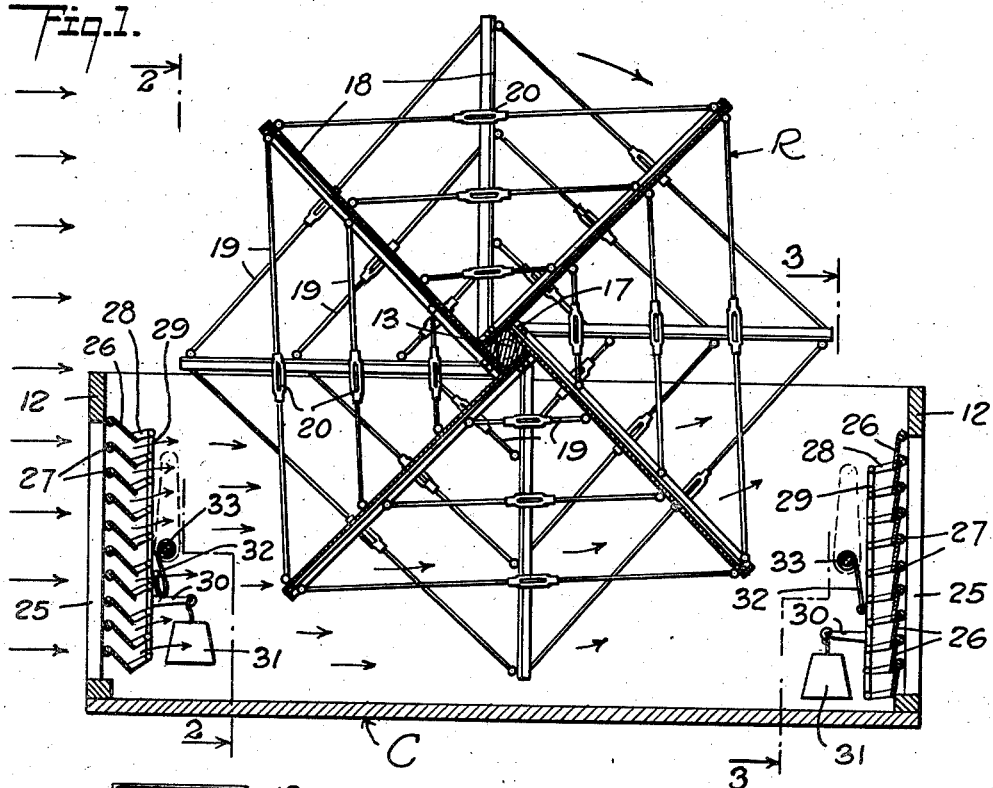
Figure 1 is a vertical longitudinal sectional view of one form of wind power plant embodying this invention.

The end walls 12 are provided with air inlets 25 which take up the width of the chamber C and the major portion of its height. Each of these inlets is controlled by a governor mechanism in the form of a vertical set of shutters 26 mounted at their upper edges on suitable rods 27 for pivotal movement from the closed position shown at the right side of Figure 1, to various open positions, of which one is illustrated at the left hand side of this figure. The shutters of each set are provided with arms 28 pivotally connected to a link 29 for movement of the shutters as a unit. An arm 30 projects from the link 29 and has suspended therefrom a body 31 constituting a weight which urges the shutters closed with a predetermined force depending on the size of the weight. Connected to the link 30 is one end of a cable or chain 32, the other end of which is secured to a drum 33 fixed to a shaft 34 journaled in the side walls 11 and having fixed thereto a crank handle 35. A latching pin 36 is mounted in the handle and is adapted to enter a suitable keeper opening 37 in the respective side wall 11 for a purpose to be described in the operation of the invention which is as follows:

Let it be assumed that the wind is coming from the left in Figure 1 as indicated by the column of arrows. Those vanes 18 which are exposed above the level of the top of the chamber C receive the full force of the wind, which thus tends to rotate the rotor R in a clockwise direction. However, those vanes which are within the chamber C receive only a portion of the force of the wind through the left hand inlet 25, which portion tends to rotate the rotor in a counterclockwise direction, thus creating a braking effect upon the rotor, the magnitude of which is dependent on the percentage of the total force of the wind which is permitted to enter the chamber by opening of the shutters in opposition to the action of the weight 31.

The differential between the superior force acting upon the upper portion of the rotor, and the inferior force acting upon the lower portion of the rotor, determines the amount of torque developed at the shaft 13, and hence the speed of rotation of the rotor. By varying the size of the weight, the wind velocity required to open the shutters 26 will be varied to accordingly vary the speed of the rotor. It will thus be clear that by a proper choice of weight size, the maximum speed of the rotor can be predetermined, so that the rotor will operate at a maximum safe speed irrespective of the velocity of the wind acting upon the rotor.

During this operation as above described, the other set of shutters 26 controlling the right hand inlet 25 in Figure 1 are maintained closed by the respective weight 31. Should the wind be coming from the right in Figure 1, such other set of shutters will be operative, and the rotor R will of course be driven in a counterclockwise direction.

By winding up the cable 32 with the crank handle 35, and latching same with the pin 36 in a position wherein the shutters 26 will be sustained in fully open position, the force of the wind acting upon the rotor R above and below its axis, will be substantially equal, so that the force tending to rotate the rotor will be practically zero, resulting in an effective brake maintaining the rotor at rest.

I claim:

In a wind driven power plant, a chamber having an air inlet at one side and open at the top; a rotor having circumferentially spaced vanes and rotatably mounted about a horizontal axis, with the portion of the rotor below its axis disposed in said chamber, and the portion of the rotor above its axis projecting above the chamber; shutters spanning said air inlet and operatively connected for adjustment as a unit to open and close said inlet; a weight connected to said shutters and urging the latter closed with a predetermined force in opposition to the force of the wind tending to open the shutters and act upon the portion of the rotor in the chamber; a winding shaft having a drum; a handle secured to the winding shaft; a flexible member wound upon the drum and connected to the shutters to move the latter to open position in response to winding of the flexible member on the drum; and a latching device by which said member can be maintained wound on the drum to sustain the shutters in fully open position against the action of said weight.

THOMAS E. LAW.